*(12)* United States Patent
Pett

(10) Patent No.: US 8,423,970 B2
(45) Date of Patent: *Apr. 16, 2013

(54) METHOD, COMPUTER PROGRAM PRODUCT, AND HARDWARE PRODUCT FOR HANDLING BREAKPOINTS IN AN ASYNCHRONOUS DEBUG MODEL

(75) Inventor: Roger H. E. Pett, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1254 days.

This patent is subject to a terminal disclaimer.

(21) Appl. No.: 12/206,771

(22) Filed: Sep. 9, 2008

(65) Prior Publication Data

US 2010/0064283 A1    Mar. 11, 2010

(51) Int. Cl.
*G06F 9/45* (2006.01)
(52) U.S. Cl.
USPC ........................................... 717/129
(58) Field of Classification Search .................. 717/129
See application file for complete search history.

(56) References Cited

U.S. PATENT DOCUMENTS 7,945,900 B2 *    5/2011    Hsieh et al. .................. 717/129

OTHER PUBLICATIONS

DataGrid: Job Submission User Interface Man Pages; Oct. 7, 2001; pp. 1-40.
DataGrid: WP1—WMS Software Administrator and User Guide; Sep. 16, 2002; pp. 1-116.

* cited by examiner

*Primary Examiner* — John Chavis
(74) *Attorney, Agent, or Firm* — Cantor Colburn LLP; Jeff Tang

(57) ABSTRACT

Breakpoints are handled in an asynchronous debug model by building a queue of basic operations to run a debug application program interface (API). User commands are each broken down into a simple command and placed on the queue. In response to a debug event, a new simple command is generated. If, when a first command on the queue is processed, a thread is not stopped at a location with an installed breakpoint, an operation corresponding to the first command is started, the operation is removed from the queue, and a next operation is started. If the thread is stopped at the location with the breakpoint, the thread performs a hop. When the hop terminates, the first command is removed from the queue. If the first command is a run command, and there is no cause to stop the thread, the run command is moved to the end of the queue.

13 Claims, 2 Drawing Sheets

METHOD, COMPUTER PROGRAM PRODUCT, AND HARDWARE PRODUCT FOR HANDLING BREAKPOINTS IN AN ASYNCHRONOUS DEBUG MODEL

BACKGROUND

1. Field of the Invention

This invention relates to the field of debugging compiled computer languages and, in particular, to methods, computer program products, and hardware products for handling breakpoints in an asynchronous debug model.

2. Description of Background

In a debugger for compiled languages, it is common to implement a location breakpoint, such as a source line, a code address, or a function entry point, by substituting a machine instruction that causes a trap for the machine instruction at the breakpoint location. Modern architectures usually make the process of implementing a location breakpoint quite simple by providing an instruction specifically for this purpose. When an application being debugged reaches the trap instruction, the debugger receives a signal. If the debugger needs to restart the application, the debugger must perform the following sequence of operations, herein referred to as a "hop": (1) replace an original instruction; (2) make the application step one instruction (machine step); and (3) replace the trap instruction.

The foregoing procedure works well if the application has only one thread of execution. If the application has multiple threads, the simple implementation of this procedure could result in another thread running through the location while the breakpoint is removed. One possible solution is to prevent the other threads from executing while the trap is removed. However, a problem occurs when the debugger is run in an asynchronous debug mode. In a synchronous debugger, all threads are stopped when any thread stops. By contrast, in an asynchronous debugger, only the thread that has the debug event stops. Various solutions exist for addressing the problems of preventing threads from executing and of restarting only a subset of the threads of the application after a debug event occurs. These problems must be solved if one is to construct a debugger for multithreaded applications. A significant problem may occur if many threads are stopped at locations that contain breakpoints and the debugger needs to restart two or more of these threads. This scenario is common in situations where one is attempting to debug the parallel code in an application that uses a technology such as Open Multi-Processing (OpenMP). OpenMP, discussed herein solely for purposes of illustration, is an application programming interface (API) that supports multi-platform shared memory multiprocessing programming in C/C++ and Fortran on many architectures, including Unix™ and Microsoft Windows™ platforms. OpenMP includes a set of compiler directives, library routines, and environment variables that influence run-time behavior. Another illustrative environment is Unified Parallel C (UPC).

If the breakpoint is in a loop, it is undesirable for the debugger to cause any of the threads in the application to "hog" the CPU. If one simply hops off the breakpoint and then allows the thread to run, it is very likely that the same thread will return to the breakpoint before any of the other threads can be started.

SUMMARY

A computer program product includes a storage medium readable by a processing circuit and storing instructions for execution by the processing circuit for facilitating a method for handling breakpoints in an asynchronous debug model. The method includes building a queue of basic operations to run a debug application program interface (API); breaking down each of a plurality of user commands into a simple command comprising one of a run command or a machine step; placing the simple command on the queue; in response to an occurrence of a debug event, providing the debug event to a user command processing mechanism to generate a new simple command; and if, when a first command on the queue is processed, a thread is not stopped at a location with an installed breakpoint, then an operation corresponding to the first command is started, the operation is removed from the queue, and a next operation on the queue is started; otherwise, if the thread is stopped at the location with the installed breakpoint, then the thread is given a command to perform a hop operation, such that any other threads are frozen and, when the hop operation terminates, the first command is removed from the queue.

A hardware product includes a storage medium readable by a processing circuit and storing instructions for execution by the processing circuit for facilitating a method for handling breakpoints in an asynchronous debug model. The method includes building a queue of basic operations to run a debug application program interface (API); breaking down each of a plurality of user commands into a simple command comprising one of a run command or a machine step; placing the simple command on the queue; in response to an occurrence of a debug event, providing the debug event to a user command processing mechanism to generate a new simple command; and if, when a first command on the queue is processed, a thread is not stopped at a location with an installed breakpoint, then an operation corresponding to the first command is started, the operation is removed from the queue, and a next operation on the queue is started; otherwise, if the thread is stopped at the location with the installed breakpoint, then the thread is given a command to perform a hop operation, such that any other threads are frozen and, when the hop operation terminates, the first command is removed from the queue.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
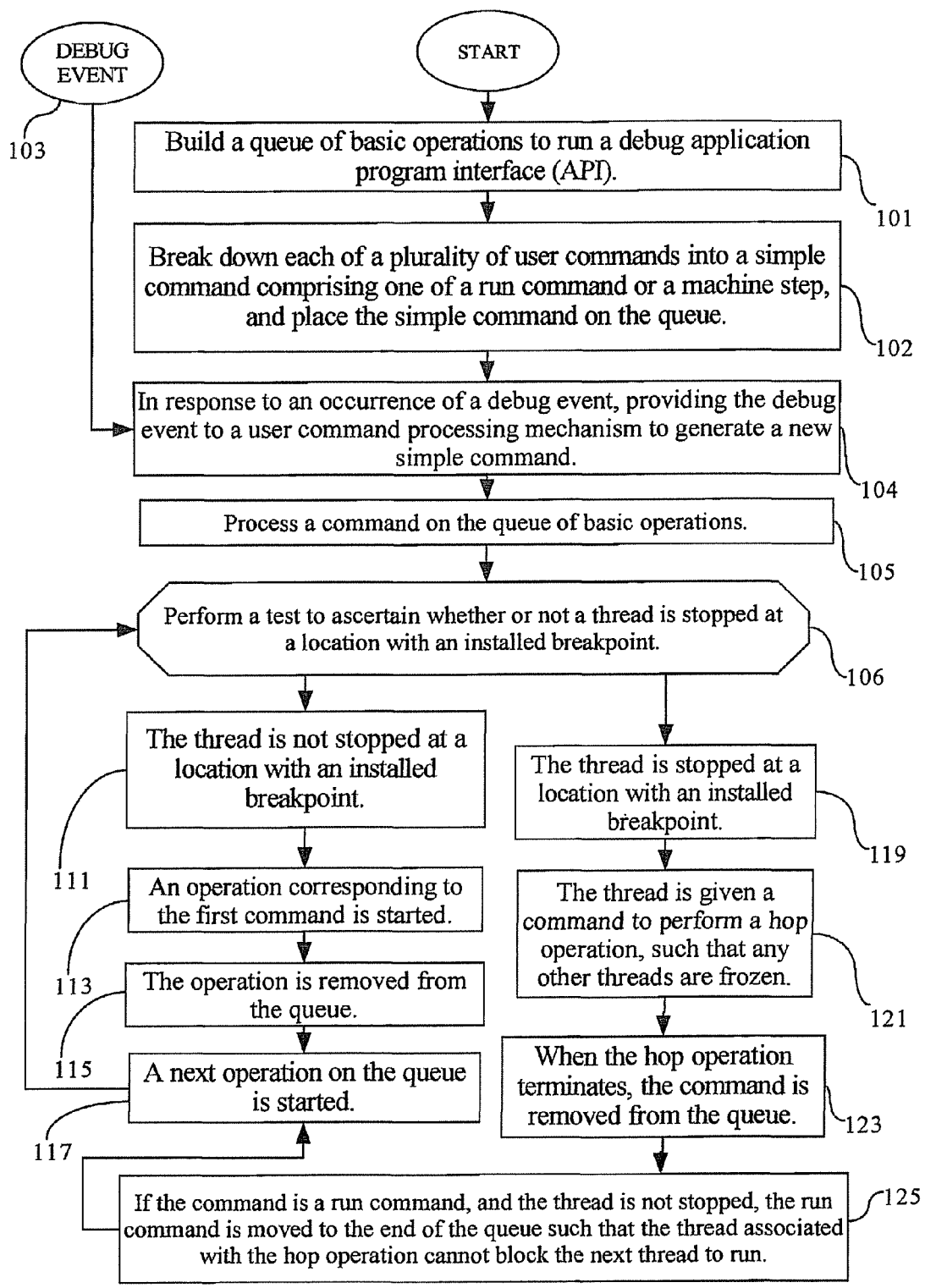
FIG. 1 is a flowchart setting forth an illustrative operational sequence for handling breakpoints in an asynchronous debug model by building a queue of basic operations to run a debug application program interface (API).

FIG. 1 is a flowchart setting forth an illustrative operational sequence for handling breakpoints in an asynchronous debug model by building a queue of basic operations to run a debug application program interface (API). The method commences at block 101 where a queue of basic operations is built to run a debug application program interface (API). Next, at block 102, each of a plurality of user commands is broken down into a simple command comprising one of a run command or a machine step and placed on the queue. In response to an occurrence of a debug event (block 103), the procedure advances to block 104 where the debug event is provided to a user command processing mechanism to generate a new simple command. At any one time, there will be at most one simple command for each thread in the application on the queue.

Next, a command on the queue is processed at block 105. At block 106, a test is performed to ascertain whether or not a thread is stopped at a location with an installed breakpoint. If the thread is not stopped at a location with an installed breakpoint, the command is processed according to a sequence of operations commencing at block 111. Otherwise, if the thread is stopped at a location with an installed breakpoint, the command is processed according to a sequence of operations commencing at block 119. From block 111, the procedure advances to block 113 where an operation corresponding to the command is started, the operation is removed from the queue (block 115), and a next operation on the queue is started (block 117). The procedure loops back to block 106.

If the thread is stopped at a location with an installed breakpoint (block 119), the thread is given a command to perform a hop operation (block 121), such that any other threads are frozen. The hop operation may include the following sequence of operations: (1) replace an original instruction; (2) make the API step one instruction (machine step); and (3) replace a trap instruction. When the hop operation terminates, the command is removed from the queue (block 123). If the command is a run command, and the thread is not stopped (i.e., there is no cause to stop the thread), the run command is moved to the end of the queue such that the thread associated with the hop operation cannot block the next thread to run (block 125). Illustratively, the breakpoint referred to previously may be a location breakpoint, such as a source line, a code address, or a function entry point. The program continues to block 117 to start the next operation on the queue, and the program then loops back to block 106.

Figure 2:
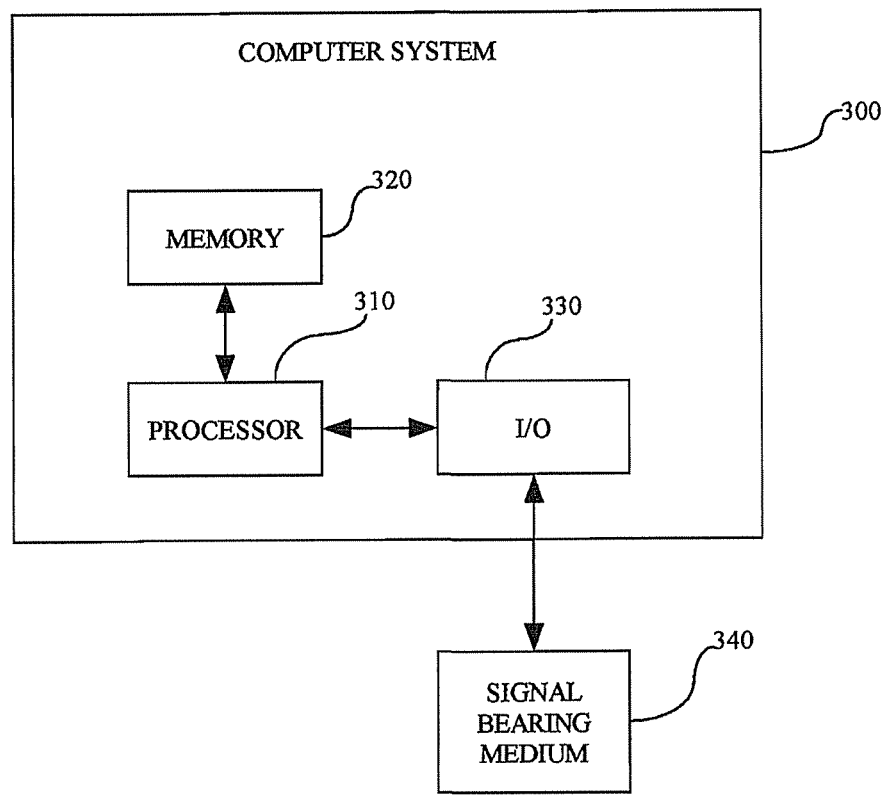
FIG. 2 is a block diagram setting forth an illustrative computer program product or hardware product for handling breakpoints in an asynchronous debug model by building a queue of basic operations to run a debug application program interface (API).

FIG. 2 is a block diagram setting forth an illustrative computer program product or hardware product for handling breakpoints in an asynchronous debug model by building a queue of basic operations to run a debug API. The system includes a computer 300 operatively coupled to a signal bearing medium 340 via an input/output interface (I/O) 330. The signal bearing medium 340 may include a representation of instructions for handling breakpoints in an asynchronous debug model by building a queue of basic operations to run a debug API, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for handling breakpoints in an asynchronous debug model by building a queue of basic operations to run a debug API, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program comprising instructions for handling breakpoints in an asynchronous debug model by building a queue of basic operations to run a debug API. The instructions build the queue by breaking down each of a plurality of user commands into a simple command comprising one of a run command or a machine step and placed on the queue. In response to an occurrence of a debug event, the debug event is given back to a user command processing mechanism to generate a new simple command. If, when a first command on the queue is processed, a thread is not stopped at a location with an installed breakpoint, then an operation corresponding to the first command is started, the operation is removed from the queue, and a next operation on the queue is started. Otherwise, if the thread is stopped at the location with the installed breakpoint, then the thread is given a command to perform a hop operation, such that any other threads are frozen. When the hop operation terminates, the first command is removed from the queue. If the first command is a run command, and there is no cause to stop the thread, the run command is moved to the end of the queue such that the thread associated with the hop operation cannot block a next thread to be run. The next operation on the queue corresponding to a next simple command is then processed. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product comprising a storage medium readable by a processing circuit and storing instructions for execution by the processing circuit for facilitating a method for handling breakpoints in an asynchronous debug model, the method comprising:
    building a queue of basic operations to run a debug application program interface (API);
    breaking down each of a plurality of user commands into a simple command comprising one of a run command or a machine step;
    placing the simple command on the queue;
    in response to an occurrence of a debug event, providing the debug event to a user command processing mechanism to generate a new simple command; and
    if, when a first command on the queue is processed, a thread is not stopped at a location with an installed breakpoint, then an operation corresponding to the first command is started, the operation is removed from the queue, and a next operation on the queue is started; otherwise, if the thread is stopped at the location with the installed breakpoint, then the thread is given a command to perform a hop operation, such that any other threads are frozen and, when the hop operation terminates, the first command is removed from the queue.

2. The computer program product of claim 1 wherein, if the first command is a run command, and the thread is not stopped, the run command is moved to the end of the queue such that the thread associated with the hop operation cannot block a next thread to be run.

3. The computer program product of claim 2 further comprising processing the next operation on the queue corresponding to a next simple command.

4. The computer program product of claim 3 wherein the next simple command comprises a second command, the method further comprising processing the second command after the first command.

5. The computer program product of claim 1 wherein the hop operation includes performing a replacement of an original instruction.

6. The computer program product of claim 5 wherein the hop operation further includes causing the debug application program interface (API) to step ahead one instruction or machine step.

7. The computer program product of claim 6 wherein the hop operation further includes performing a replacement of a trap instruction.

8. A hardware product comprising a storage medium readable by a processing circuit and storing instructions for execution by the processing circuit for facilitating a method for handling breakpoints in an asynchronous debug model, the method comprising:
    building a queue of basic operations to run a debug application program interface (API);
    breaking down each of a plurality of user commands into a simple command comprising one of a run command or a machine step;
    placing the simple command on the queue;
    in response to an occurrence of a debug event, providing the debug event to a user command processing mechanism to generate a new simple command; and
    if, when a first command on the queue is processed, a thread is not stopped at a location with an installed breakpoint, then an operation corresponding to the first command is started, the operation is removed from the queue, and a next operation on the queue is started; otherwise, if the thread is stopped at the location with the installed breakpoint, then the thread is given a command to perform a hop operation, such that any other threads are frozen and, when the hop operation terminates, the first command is removed from the queue.

9. The hardware product of claim 8 wherein, if the first command is a run command, and the thread is not stopped, the run command is moved to the end of the queue such that the thread associated with the hop operation cannot block a next thread to be run.

10. The hardware product of claim 9 further comprising processing the next operation on the queue corresponding to a next simple command.

11. The hardware product of claim 10 wherein the next simple command comprises a second command, the method further comprising processing the second command after the first command.

12. The hardware product of claim 8 wherein the hop operation includes performing a replacement of an original instruction.

13. The hardware product of claim 12 wherein the hop operation further includes causing the debug application program interface (API) to step ahead one instruction or machine step, and performing a replacement of a trap instruction.

* * * * *